Figure 3:
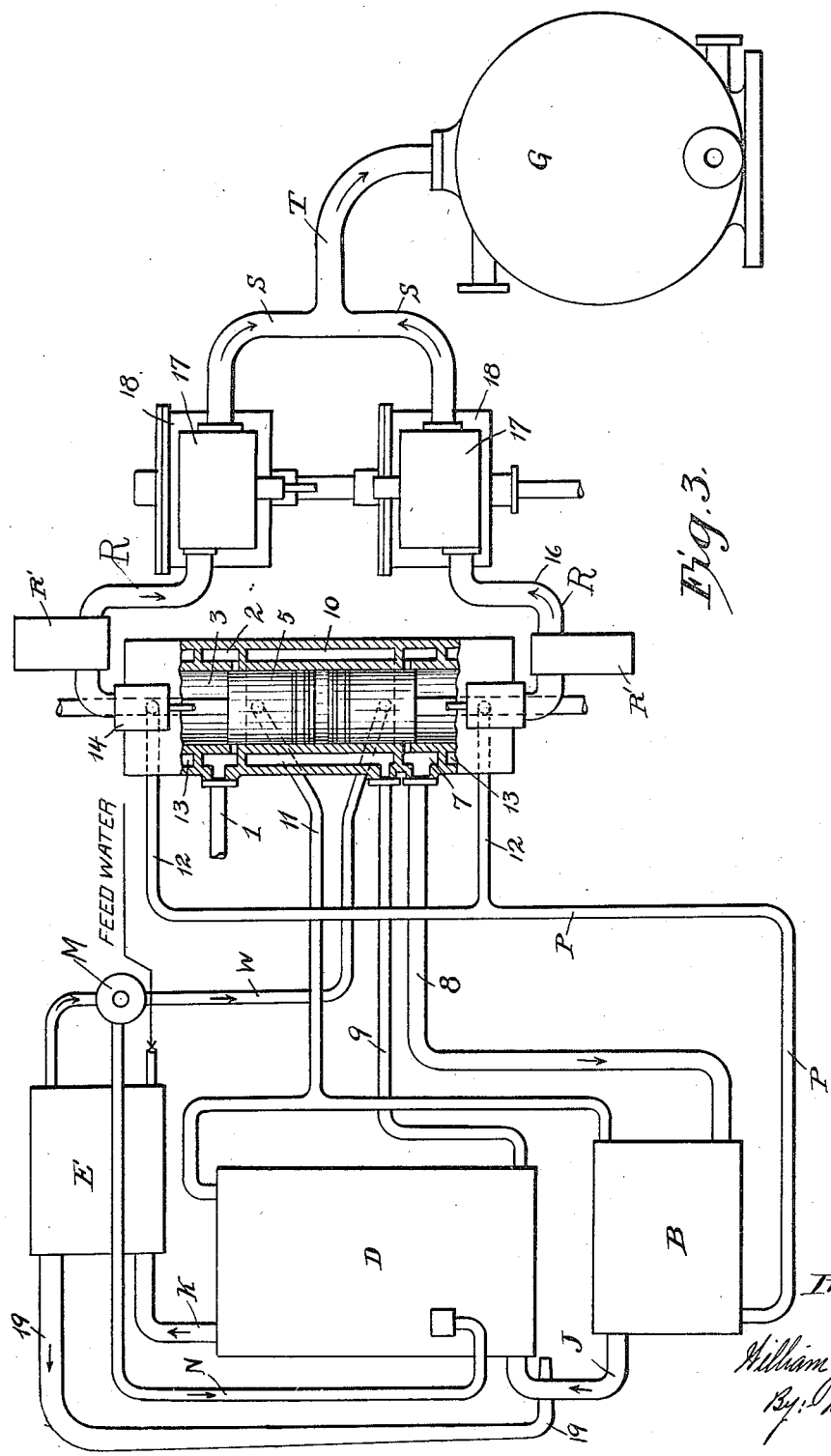

W. J. STILL.
INTERNAL COMBUSTION ENGINE.
APPLICATION FILED DEC. 5, 1913.
1,230,617.
Patented June 19, 1917.
2 SHEETS—SHEET 1.
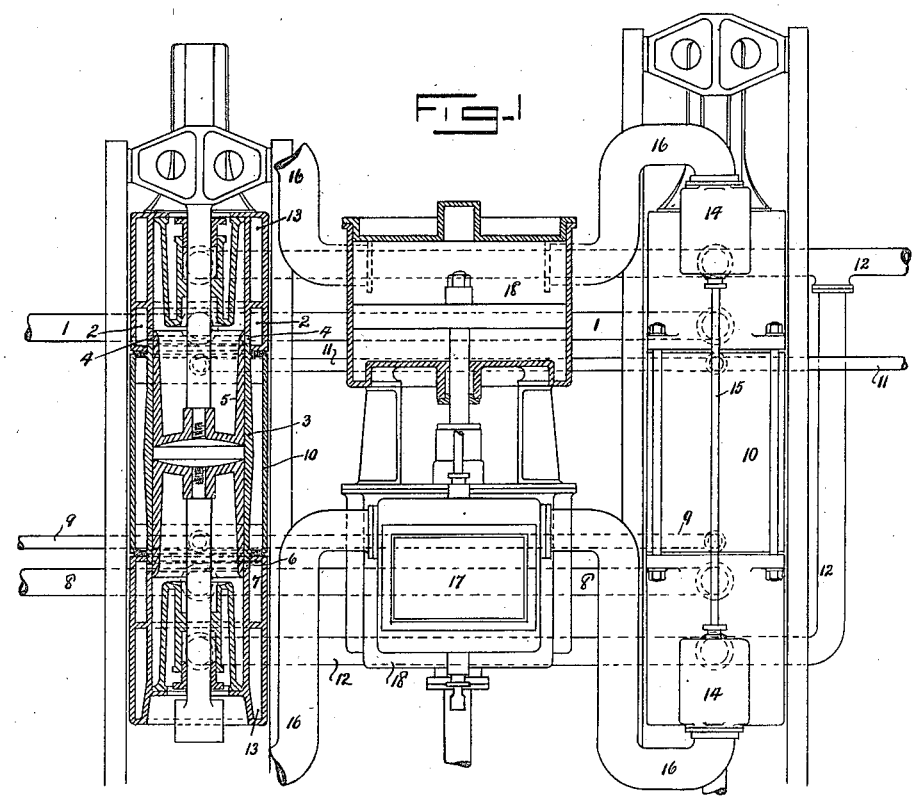
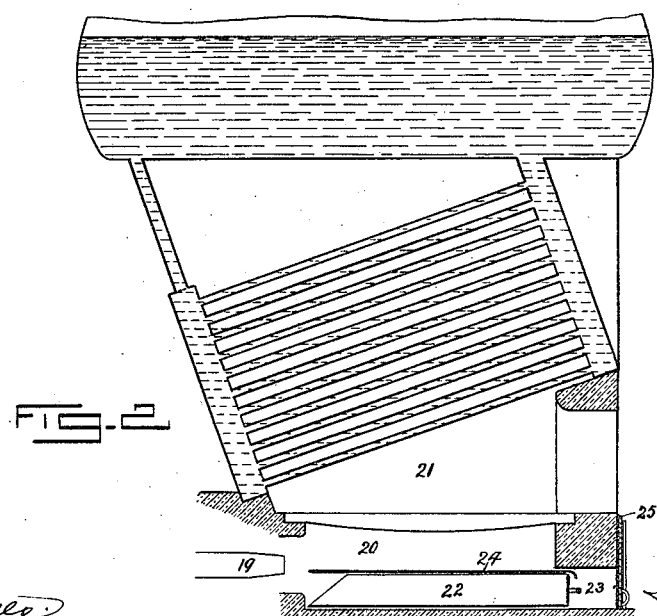

W. J. STILL.
INTERNAL COMBUSTION ENGINE.
APPLICATION FILED DEC. 5, 1913.

1,230,617.

Patented June 19, 1917.
2 SHEETS—SHEET 2.

Inventor,
William Joseph Still,
By B. Singer,
Atty.

UNITED STATES PATENT OFFICE.

WILLIAM JOSEPH STILL, OF LONDON, ENGLAND.

INTERNAL-COMBUSTION ENGINE.

1,230,617.  Specification of Letters Patent.  Patented June 19, 1917.

Application filed December 5, 1913. Serial No. 804,927.

*To all whom it may concern:*

Be it known that I, WILLIAM JOSEPH STILL, of London, England, have invented certain new and useful Improvements in Internal-Combustion Engines, of which the following is a specification.

This invention relates to improvements in and connected with internal combustion engines and has reference to engines of this type adapted to operate also under steam generated wholly or partially by heat derived from the combustion cylinder walls and from the combustion exhaust, and the object of the present invention is a more efficient utilization of the heat of the combustion engine for the generation of steam.

The invention consists primarily in a particular arrangement and mode of operation whereby feed water preheated by the exhaust from the combustion engine in its final condition, *i. e.* immediately before it finally passes from the exhaust pipe, is evaporated in the cylinder jacket and the steam thus produced is superheated by the exhaust from the combustion engine in its initial condition, *i. e.* as it leaves the combustion chamber. This combustion exhaust is then utilized in a boiler to evaporate further preheated water and the exhaust in its final condition is as aforesaid employed for the preheating of feed water. Steam thus produced is introduced into the combustion engine cylinder and is expanded therein in contact with one side of the piston which divides it from the combustion.

By the use of additional supplies of fuel, however, the combustion cylinders can be employed as high pressure cylinders and the steam exhausted from these cylinders can be utilized in a low pressure steam cylinder or cylinders, and a convenient arrangement would be to have a two cylinder combustion engine whose cranks are at 180° and operate as high pressure steam cylinders and exhaust to a common double acting low pressure steam cylinder with its crank set at 90°. Of course this latter arrangement could be duplicated and four combustion high pressure cylinders utilized in conjunction with two low pressure steam cylinders. Further the exhaust steam from the combustion cylinders when such cylinders are employed as high pressure cylinders can be utilized to operate a steam turbine.

This reheating will however in any case occur owing to the contact of the steam with the heated surfaces of the combustion cylinder and piston and thus a very effective cycle is provided which may be summarized as follows:

Evaporation of water into steam is effected in the combustion cylinder jackets and in a boiler by means of added fuel and probably also by the combustion exhaust. Slight superheat of the steam is effected by the waste heat in the combustion engine exhaust, the steam is then admitted to the back of the combustion pistons and operates expansively at the same time taking up heat from the piston cylinder, after which it is exhausted to any suitable low pressure motor as for instance to a low pressure cylinder or cylinders on the main shaft and thence is exhausted to a condenser.

When a class of fuel unsuited for use within a combustion engine, such for instance as coal, can be purchased at a low cost relatively to that of the fuel necessary for operating the combustion engine, the construction in accordance with the foregoing conditions, enables power to be obtained from a proper combustion of both fuels at a lower cost than by the use of either singly. The cycle is as follows: Combustion is produced within the internal combustion engine cylinder (or cylinders) by the use of the more expensive fuel, and the cylinders of the combustion engine are cooled by the evaporation in the cylinder jackets of water into steam.

The combustion exhaust is used to superheat the steam generated in the jackets and boiler; the cooled combustion exhaust may be finally ejected through a nozzle or a group of nozzles so as to induce a flow of air into the ashpits of suitable boilers—much in the same way that draft is induced by steam in locomotives—and by mixing with the air to heat it previous to its combustion with the lower priced fuel in the furnace of these boilers.

The steam evaporated in the boiler is added to that evaporated in the jackets, supplied to the combustion engine and expanded behind the main pistons during the return or compression strokes.

After expansion and reheating as before mentioned the steam is further expanded in a low pressure turbine or in a large low pressure cylinder. The air required to burn the lower priced fuel is thus injected into the ashpit of the boiler by pressure of exhaust gases and mixed with and raised by them to a comparatively high temperature previous to facilitating the combustion.

These exhaust gases are not inert but contain, especially in Diesel and 2 cycle engines, combustible matter and boilers thus fed may give a steam evaporation equal to or even greater than the heating value of the low priced fuel with which they are supplied.

A closed stoke-hold under a small air pressure (as from a fan) should be employed to balance the pressure due to the exhaust so as to facilitate stoking and check gas leakage through casing joints; the volume of air to be delivered to maintain this pressure will be small as the main supply is forced by the exhaust, and little if any is required above the grate to assist combustion.

The combustion engine is used to greater advantage in that the mean steam pressure within it is greatly increased and the heavy construction required to withstand combustion pressure more fully utilized, the lower pressures inherent to extreme expansions being more cheaply dealt with in a lightly constructed low pressure cylinder or an exhaust turbine.

In the accompanying drawings I have illustrated an engine constructed and operating in accordance with the foregoing general principles, Figure 1 being a sectional elevational view of the engine comprising two separate combustion cylinders each of the opposed piston type and each provided with a pair of steam cylinders at the backs of the pistons, and including also two low pressure cylinders. Fig. 2 is a diagrammatic view of the boiler arrangements. Fig. 3 is a diagram illustrating the method of utilizing the waste heat of the exhaust gases for generating and superheating steam and preheating feed water for the boiler.

In the drawings the combustion side of the engine operates on the two-stroke cycle system. It is supplied with a mixture of hydrocarbon vapor and air (or air only if working on the Diesel cycle) under pressure by a pipe 1 which leads to annular chambers 2 around the cylinder 3. This chamber communicates with the interior of the cylinder 3 by way of a ring of ports 4 which are uncovered by the piston 5 at the end of the working stroke. The exhaust is by way of a ring of ports 6 and an annular chamber 7, both of which are similar to those described above, to the common exhaust pipe 8. The pipe 9 conveys heated feed water to the bottom of the jacket 10 which feed water is evaporated therein. The steam produced is drawn off at the top of the jacket by the pipe 11. This steam, after being superheated in the superheater $e$ (Fig. 3) by the exhaust gases from the internal combustion engine in their initial condition, is conducted by pipes 12 to jackets 13 around the cylinders 3 which are in communication with valve chests 14 containing slide valves coupled by a rod 15. These valves distribute the steam to the cylinders 3 on the sides of the pistons opposite to the combustion chambers. The steam exhausts into pipes 16 which lead to the valve chests 17 of low pressure cylinders 18 in which cylinders it is further expanded and from which it is exhausted to a condenser.

In Fig. 2 I have illustrated diagrammatically the method I prefer for inducing the necessary air supply for effecting the combustion of the fuel beneath the boiler. The numeral 19 designates a nozzle or group of nozzles through which the combustion engine exhaust—after it has been utilized for superheating steam as in superheater $e$, and preheating feed water as in preheater $f$—is injected into the ash-pit 20. The inrushing exhaust gases induce a supply of air to the furnace, which air completes the combustion of the exhaust gases and supplies the furnace 21 with oxygen.

Fig. 3 shows diagrammatically the preferred method of carrying out my invention. The combustion exhaust is led from cylinder 3 by pipe 8 to the superheater B and then to the boiler D by pipe J. From the boiler D the exhaust gases pass by the pipe K to the feed water preheater E and from thence to the ash pit of the boiler by the pipe 19. The preheated feed water is supplied to the jacket of the combustion engine cylinder through the pipe W by means of feed pump M which also delivers feed water to the check valve of the boiler through the pipe N. Steam is taken from the top of the combustion cylinder jacket and boiler by pipe 11 and thence to superheater. Superheated steam is then conducted by pipes P and 12 to the valve chest of the steam cylinders at the ends of the combustion cylinder, the exhaust steam being delivered to the valve chests of the low pressure cylinders F by means of the pipes R R. The final exhaust from the low pressure cylinders passes to the condenser G by way of pipes S S and T. If preferred, the pipe R between the high pressure cylinders and the low pressure cylinders may be interrupted to contain a reheater R'.

In order to insure continuous working, the pressure in the boiler or stoke room could be maintained slightly above that of the blast thus preventing loss of air when the furnace door or the ash-pit is opened. Or, alternatively, an ash tray 22 which is a fair fit in the opening 24 to the ash-pit 20 could be provided to be used in conjunction with a cover 24 which is pushed in on the top of the ash tray before the ash tray is withdrawn and is replaced with it, being again withdrawn after the replacement. During the removal and replacement of the ash tray the guillotine door 25 of the ash pit rests upon the cover 24 and therefore falls immediately the ash tray is clear of it. Thus negligible escape of blast is all that is possible.

What I claim and desire to secure by Letters Patent is:

1. In an internal combustion engine adapted to operate partially under steam, a combustion cylinder, a cylinder jacket forming part of a steam generator, a steam superheater, connections for leading steam from the generator to the superheater, a feed water heater, connections leading the combustion exhaust from the cylinder to the steam superheater and thence to the feed water preheater.

2. In an internal combustion engine adapted to operate partially under steam, a combustion cylinder, a steam generation system, a steam superheater, a feed water preheater, connections leading water from the preheater to the steam generator system, connections leading the combustion exhaust from the cylinder to the steam superheater, thence to the steam generator and thence to the feed water preheater.

3. In an internal combustion engine adapted to operate partially under steam, a combustion cylinder, a steam generation system including an ash pit, a steam superheater, a feed water preheater, connections leading water from the preheater to the steam generator system, connections leading the combustion exhaust from the cylinder to the steam superheater, thence to the steam generator, thence to the feed water preheater, and thence to nozzles located in the ash pit of the steam generator.

4. In an internal combustion engine adapted to operate partially under steam, a combustion cylinder, a cylinder jacket associated with a steam generator, a steam generator, a steam superheater, connections leading steam from the cylinder jacket and steam generator to the steam superheater, a feed water heater, connections leading the feed water to the steam generator and cylinder jacket, connections leading the exhaust gases from the engine cylinder to the superheater thence to the generator and thence to the feed water preheater.

5. In an internal combustion engine adapted to operate partially under steam, an internal combustion cylinder, a jacket for said cylinder, a preheater, connections for leading water into said preheater and for leading water from said preheater to said cylinder, a steam superheater, steam connections from said jacket to said superheater, and exhaust connections from said cylinder to said superheater and from thence to said preheater.

6. A prime mover comprising in combination, a combustion cylinder having a jacket, a preheater, connections for leading water into said preheater and for leading water from said preheater to said cylinder jacket, said cylinder having a piston therein, and one half of the cylinder being arranged to serve as a steam cylinder, a steam connection between said jacket and the steam side of the cylinder, a steam superheater, said superheater being disposed intermediate the jacket and the steam side of the cylinder and the exhaust from the combustion side of the cylinder being led directly to the superheater whereby the heat of the exhaust is utilized directly for superheating and exhaust connection from said superheater to said preheater.

7. In apparatus of the class described in combination, an engine having an internal combustion cylinder and a steam cylinder, a boiler having a furnace, steam connections between said boiler and said steam cylinder, exhaust connections between said combustion cylinder and the ash pit of said furnace, said last mentioned connections having an ejector nozzle to induce a flow of air into the ash pit, means for abstracting heat from the exhaust of said combustion cylinder prior to its entrance into the ash pit, and an arrangement for burning said exhaust in the furnace.

8. In an internal combustion engine adapted to operate partially under steam, a combustion cylinder, a cylinder jacket forming part of a steam generator, a steam superheater, connections for leading steam from the generator to the superheater, a feed water heater, connections leading the combustion exhaust from the cylinder to the steam superheater and thence to the feed water preheater, and steam connections leading from the steam superheater to the steam side of the engine.

9. In an internal combustion engine adapted to operate partially under steam, a combustion cylinder, a cylinder jacket forming part of a steam generator, a steam superheater, connections for leading steam from the generator to the superheater, a feed water heater, connections leading the combustion exhaust from the cylinder to the steam superheater and thence to the feed water preheater, and steam connections leading from the steam superheater to a cylinder operating as a high pressure steam cylinder and connections whereby the steam exhausted from the high pressure steam cylinder passes to a low pressure steam operated member.

10. In an internal combustion engine adapted to operate partially under steam, a combustion cylinder, a cylinder jacket forming part of a steam generator, a steam superheater, connections for leading steam from the generator to the superheater, a feed water heater, connections leading the combustion exhaust from the cylinder to the steam superheater and thence to the feed water preheater, steam connections leading from the steam superheater to a cylinder operating as a high pressure steam cylinder, connections whereby the steam exhausted from the high pressure steam cylinder passes to a low pressure steam operated member and means whereby the steam exhausted from the high pressure cylinder is reheated prior to its expansion in the low pressure member.

In testimony whereof I affix my signature in presence of two witnesses.

WILLIAM JOSEPH STILL.

Witnesses:
ALFRED AUGUSTUS THORNTON,
O. J. WORTH.